(12) United States Patent
Takano et al.

(10) Patent No.: US 9,798,198 B2
(45) Date of Patent: Oct. 24, 2017

(54) LIQUID CRYSTAL DISPLAY DEVICE

(71) Applicant: Japan Display Inc., Minato-ku (JP)

(72) Inventors: Keisuke Takano, Tokyo (JP); Jin Hirosawa, Tokyo (JP); Arihiro Takeda, Tokyo (JP); Hirokazu Morimoto, Tokyo (JP)

(73) Assignee: Japan Display Inc., Minato-ku (JP)

( * ) Notice: Subject to any disclaimer, the term of this patent is extended or adjusted under 35 U.S.C. 154(b) by 79 days.

(21) Appl. No.: 14/190,561

(22) Filed: Feb. 26, 2014

(65) Prior Publication Data

US 2014/0253851 A1 Sep. 11, 2014

(30) Foreign Application Priority Data

Mar. 11, 2013 (JP) .................... 2013-048269

(51) Int. Cl.
*G02F 1/1343* (2006.01)
*G02F 1/1337* (2006.01)
*G02F 1/136* (2006.01)

(52) U.S. Cl.
CPC .. *G02F 1/134309* (2013.01); *G02F 1/134363* (2013.01); *G02F 2001/13606* (2013.01); *G02F 2001/134318* (2013.01); *G02F 2001/134372* (2013.01); *G02F 2001/134381* (2013.01)

(58) Field of Classification Search
CPC .................................................. G02F 1/1337
USPC .................................... 249/123; 349/38, 129
See application file for complete search history.

(56) References Cited

U.S. PATENT DOCUMENTS

| | | | | |
|---|---|---|---|---|
| 6,469,765 B1 * | 10/2002 | Matsuyama | ...... | G02F 1/134363 349/141 |
| 6,476,896 B1 * | 11/2002 | Liu | .................. | G02F 1/133753 349/121 |
| 6,700,558 B1 * | 3/2004 | Itoh | .................. | G02F 1/134363 345/58 |
| 8,493,536 B2 * | 7/2013 | Kobayashi | ........ | G02F 1/133707 349/123 |
| 2007/0171319 A1 * | 7/2007 | Fujita | ................ | G02F 1/134309 349/43 |

(Continued)

FOREIGN PATENT DOCUMENTS

| | | |
|---|---|---|
| JP | 10-333180 A | 12/1998 |
| JP | 2006-235437 | 9/2006 |

(Continued)

OTHER PUBLICATIONS

U.S. Appl. No. 14/797,844, filed Jul. 13, 2015, Takeda, et al.

(Continued)

*Primary Examiner* — Wen-Ying P Chen
(74) *Attorney, Agent, or Firm* — Oblon, McClelland, Maier & Neustadt, L.L.P.

(57) ABSTRACT

According to one embodiment, a liquid crystal display device includes a first interlayer insulation film located above a first gate line and a second gate line, a first common electrode extending over the first interlayer insulation film, a second interlayer insulation film covering the first common electrode, and a first pixel electrode disposed on the second interlayer insulation film. The first common electrode extends, from a position opposed to the first pixel electrode, beyond the source line in the first direction and beyond the gate line in the second direction.

17 Claims, 5 Drawing Sheets

(56) References Cited

U.S. PATENT DOCUMENTS

| | | | | |
|---|---|---|---|---|
| 2007/0222907 A1* | 9/2007 | Onogi et al. | | 349/42 |
| 2008/0218645 A1* | 9/2008 | Zhu | G02F 1/134363 | 349/33 |
| 2009/0121228 A1* | 5/2009 | Kim | G02F 1/13458 | 257/59 |
| 2011/0242073 A1* | 10/2011 | Horiuchi | G02F 1/1337 | 345/204 |
| 2012/0249940 A1* | 10/2012 | Choi | G02F 1/133753 | 349/123 |
| 2012/0281173 A1* | 11/2012 | Kwon | G02F 1/133707 | 349/123 |
| 2012/0293752 A1* | 11/2012 | Takeda | G02F 1/134363 | 349/96 |
| 2013/0016297 A1* | 1/2013 | Nakamura | G02F 1/133707 | 349/46 |

FOREIGN PATENT DOCUMENTS

| | | |
|---|---|---|
| JP | 2008-197493 | 8/2008 |
| JP | 2009-42656 | 2/2009 |
| JP | 2009-122707 A | 6/2009 |
| JP | 2010-160308 | 7/2010 |
| JP | WO2013/021926 A1 | 2/2013 |

OTHER PUBLICATIONS

Office Action issued Dec. 20, 2016 in Japanese Patent Application No. 2013-048269 (with English language translation).
Japanese Office Action dated Jul. 11, 2017, issued in Japanese Patent Application No. 2013-048269 (with English translation).

* cited by examiner

F I G. 6 ns an image. The active area
LIQUID CRYSTAL DISPLAY DEVICE

CROSS-REFERENCE TO RELATED APPLICATIONS

This application is based upon and claims the benefit of priority from Japanese Patent Application No. 2013-048269, filed Mar. 11, 2013, the entire contents of which are incorporated herein by reference.

FIELD

Embodiments described herein relate generally to a liquid crystal display device.

BACKGROUND

In active matrix liquid crystal devices in which switching elements and capacitors are provided in respective pixels, a configuration which mainly uses a vertical electric field, such as a VA (Vertical Aligned) mode, has been put to practical use. In the liquid crystal display device of the vertical electric field mode, liquid crystal molecules are switched by an electric field which is produced between a pixel electrode formed on an array substrate, and a common electrode formed on a counter-substrate.

A capacitor functions to retain a voltage, which is applied to a liquid crystal layer, for a predetermined time period, and is constituted by a pair of electrodes or wiring lines which are opposed via an insulation film. For example, the capacitor is constituted by a storage capacitance line which crosses the pixel, and a storage capacitance electrode which is opposed to the storage capacitance line via an insulation film. The storage capacitance line is formed of a material with a light shield property, which is the same as the material of a gate electrode, and the storage capacitance electrode is formed of a semiconductor layer of, e.g. polysilicon. The electrode and wiring line, which constitute such a capacitor, become light-shield layers crossing the pixel, thus leading to a decrease in aperture ratio, a transmittance or a luminance per pixel, which contributes to display. Therefore, there has been a demand for improving the display quality, while securing a capacitance that is necessary for display.

DETAILED DESCRIPTION

In general, according to one embodiment, a liquid crystal display device includes: a first substrate including a first gate line and a second gate line each extending in a first direction, a first source line and a second source line each extending in a second direction crossing the first direction, a switching element electrically connected to the first gate line and the first source line, a first interlayer insulation film located above the first gate line, the second gate line, the first source line and the second source line, a first common electrode extending over the first interlayer insulation film, a second interlayer insulation film covering the first common electrode, a first pixel electrode which is disposed on the second interlayer insulation film, is opposed to the first common electrode in a pixel defined by the first gate line, the second gate line, the first source line and the second source line, and is electrically connected to the switching element, and a first alignment film covering the first pixel electrode, the first common electrode extending, from a position opposed to the first pixel electrode, beyond the first source line and the second source line in the first direction and beyond the first gate line and the second gate line in the second direction; a second substrate including a second common electrode opposed to the first pixel electrode and having the same potential as the first common electrode, and a second alignment film covering the second common electrode; and a liquid crystal layer interposed between the first alignment film and the second alignment film.

According to another embodiment, a liquid crystal display device includes: a first substrate including a gate line extending in a first direction, a source line extending in a second direction crossing the first direction, a first interlayer insulation film located above the gate line and the source line, a first common electrode extending over the first interlayer insulation film beyond the source line in the first direction and beyond the gate line in the second direction, a second interlayer insulation film covering the first common electrode, a first pixel electrode which is disposed on the second interlayer insulation film and is opposed to the first common electrode, and a first alignment film covering the first pixel electrode; a second substrate including a second common electrode opposed to the first pixel electrode and having the same potential as the first common electrode, and a second alignment film covering the second common electrode; and a liquid crystal layer interposed between the first alignment film and the second alignment film.

Embodiments will now be described in detail with reference to the accompanying drawings. In the drawings, structural elements having the same or similar functions are denoted by like reference numerals, and an overlapping description is omitted.

Figure 1:
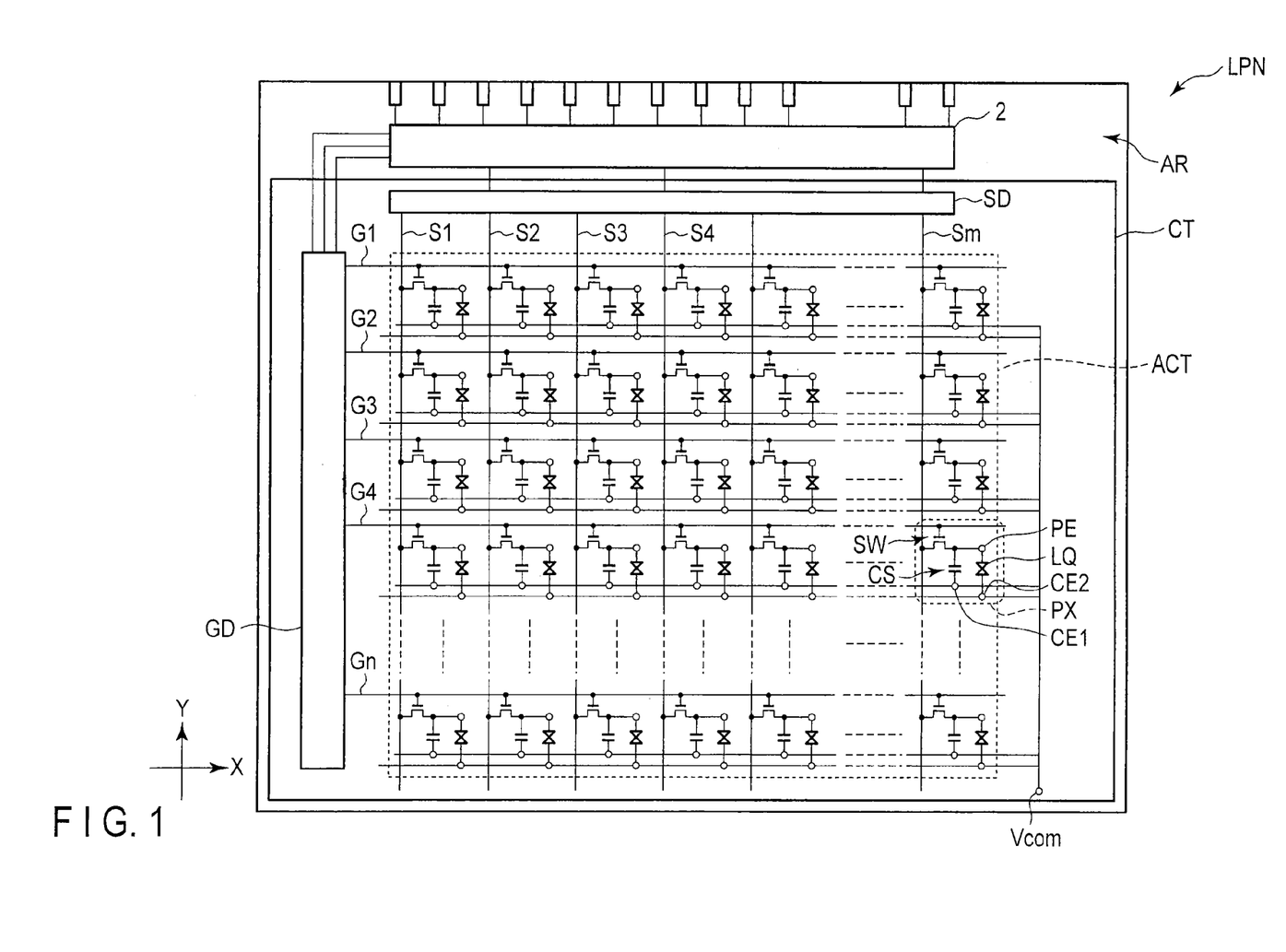
FIG. 1 is a view which schematically illustrates a structure and an equivalent circuit of a liquid crystal display panel LPN which constitutes a liquid crystal display device according to an embodiment.

FIG. 1 is a view which schematically shows a structure and an equivalent circuit of a liquid crystal display panel LPN which constitutes a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT corresponds to a region where the liquid crystal layer LQ is held between the array substrate AR and the counter-substrate CT, has a rectangular shape, for instance, and is composed of a plurality of pixels PX which are arrayed in a matrix.

The array substrate AR includes, in the active area ACT, a plurality of gate lines G (G1 to Gn) extending in a first direction X, a plurality of source lines S (S1 to Sm) extending in a second direction Y crossing the first direction X, a switching element SW which is electrically connected to the gate line G and source line S in each pixel, a pixel electrode PE which is electrically connected to the switching element SW in each pixel PX, and a first common electrode CE1 which is opposed to the pixel electrode PE. A storage capacitor CS is formed, for example, between the first common electrode CE1 and the pixel PE.

On the other hand, the counter-substrate CT includes, for example, a second common electrode CE2 which is opposed to the pixel electrode PE via the liquid crystal layer LQ.

Each of the gate lines G is led out of the active area ACT and is connected to a first driving circuit GD. Each of the source lines S is led out of the active area ACT and is connected to a second driving circuit SD. At least parts of the first driving circuit GD and second driving circuit SD are formed on, for example, the array substrate AR, and are connected to a driving IC chip 2. The driving IC chip 2 incorporates a controller which controls the first driving circuit GD and second driving circuit SD, and functions as a signal supply source for supplying necessary signals for driving the liquid crystal display panel LPN. In the example illustrated, the driving IC chip 2 is mounted on the array substrate AR, on the outside of the active area ACT of the liquid crystal display panel LPN.

The first common electrode CE1 and second common electrode CE2 have the same potential, and each of them extends over substantially the entirety of the active area ACT and is formed commonly over a plurality of pixels PX. The first common electrode CE1 and second common electrode CE2 are led out of the active area ACT and are connected to a power supply module Vcom. The power supply module Vcom is formed, for example, on the array substrate AR on the outside of the active area ACT, and is electrically connected to the first common electrode CE1 and also electrically connected to the second common electrode CE2 via an electrically conductive member (not shown). At the power supply module Vcom, for example, a common potential is supplied to the first common electrode CE1 and second common electrode CE2.

Figure 2:
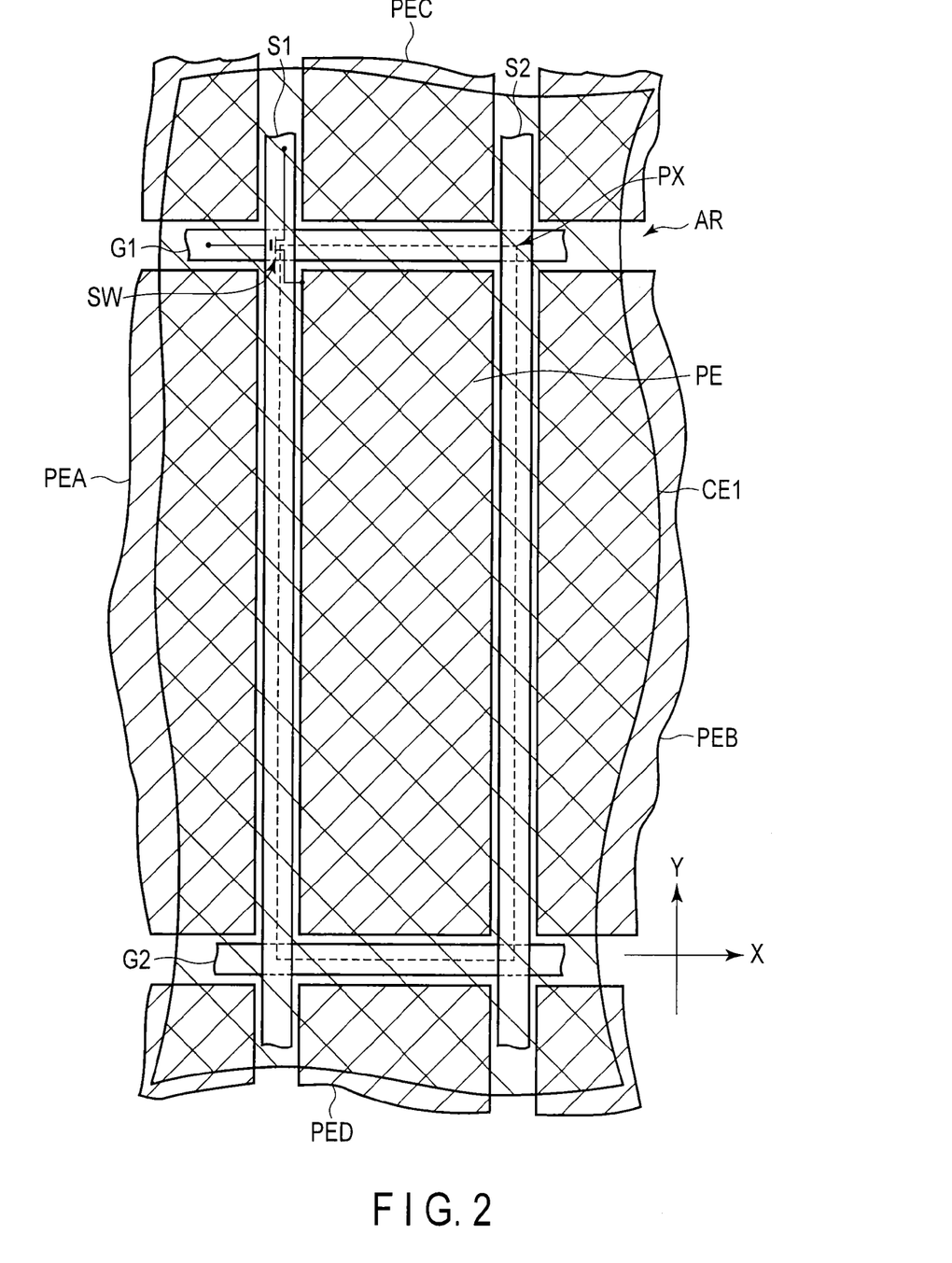
FIG. 2 is a plan view which schematically illustrates a structure example of one pixel PX of an array substrate AR which is applicable to the liquid crystal display device of the embodiment.

FIG. 2 is a plan view which schematically shows a structure example of one pixel PX of the array substrate AR which is applicable to the liquid crystal display device of the embodiment.

The array substrate AR includes a gate line G1, a gate line G2, a source line S1, a source line S2, a switching element SW, a first common electrode CE1, and a pixel electrode PE.

The gate line G1 and gate line G2 are disposed with a distance in the second direction Y, and extend in the first direction X, respectively. The source line S1 and source line S2 are disposed with a distance in the first direction X, and extend in the second direction Y, respectively. In the example illustrated, as indicated by a broken line, the pixel PX corresponds to a grid-shaped area defined by the gate line G1, gate line G2, source line S1 and source line S2, and has a rectangular shape having a less length in the first direction X than in the second direction Y. The length of the pixel PX in the first direction X corresponds to the pitch between the neighboring source line S1 and source line S2 in the first direction X. The length of the pixel PX in the second direction Y corresponds to the pitch between the neighboring gate line G1 and gate line G2 in the second direction Y.

In the pixel PX illustrated, the source line S1 is located at a left side end portion, and is disposed to extend over a boundary between the pixel PX and a pixel neighboring on the left side. The source line S2 is located at a right side end portion, and is disposed to extend over a boundary between the pixel PX and a pixel neighboring on the right side. The gate line G1 is located at an upper side end portion, and is disposed to extend over a boundary between the pixel PX and a pixel neighboring on the upper side. The gate line G2 is located at a lower side end portion, and is disposed to extend over a boundary between the pixel PX and a pixel neighboring on the lower side. In the present embodiment, as illustrated, there is no storage capacitance line which crosses the pixel PX for forming a storage capacitor.

The switching element SW is composed of, for example, an n-channel thin-film transistor (TFT), which may be of a top gate type or a bottom gate type, although a detailed illustration thereof is omitted. The switching element SW is electrically connected to, for example, the gate line G1 and source line S1.

As indicated by upper left (lower right) hatching lines in the Figure, the first common electrode CE1 is disposed over substantially the entirety of the pixel PX, and further extends from the pixel PX beyond the source line S1 and source line S2 in the first direction X and beyond the gate line G1 and gate line G2 in the second direction Y. Specifically, the first common electrode CE1 is disposed continuously over pixels neighboring on the right side and left side along the first direction X of the pixel PX, and pixels neighboring on the upper side and lower side along the second direction Y of the pixel PX. To be more specific, the array substrate AR includes, in addition to the pixel electrode PE of the pixel PX, a pixel electrode PEA of the pixel neighboring on the left side along the first direction X of the pixel PX, a pixel electrode PEB of the pixel neighboring on the right side along the first direction X of the pixel PX, a pixel electrode PEC of the pixel neighboring on the upper side along the second direction Y of the pixel PX, and a pixel electrode PED of the pixel neighboring on the lower side along the second direction Y of the pixel PX. The first common electrode CE1 continuously extends over positions opposed to the pixel electrode PEA, pixel electrode PEB, pixel electrode PEC and pixel electrode PED. Further, the first common electrode CE1 is disposed over almost the entirety of the active area ACT shown in FIG. 1, and a part of the first common electrode CE1 is led out of the active area and electrically connected to the power supply module Vcom.

As indicated by upper right (lower left) hatching lines in the Figure, the pixel electrodes PE of the respective pixels have the same shape. Each pixel electrode PE is electrically connected to the switching element SW of the pixel. The shape of the pixel electrode PE illustrated corresponds to, for example, the shape of the pixel PX, and is a rectangular shape having a less length in the first direction X than in the second direction Y. In the meantime, parts of the pixel electrode PE may extend to positions overlapping the source line S1, source line S2, gate line G1 and gate line G2.

Figure 3:
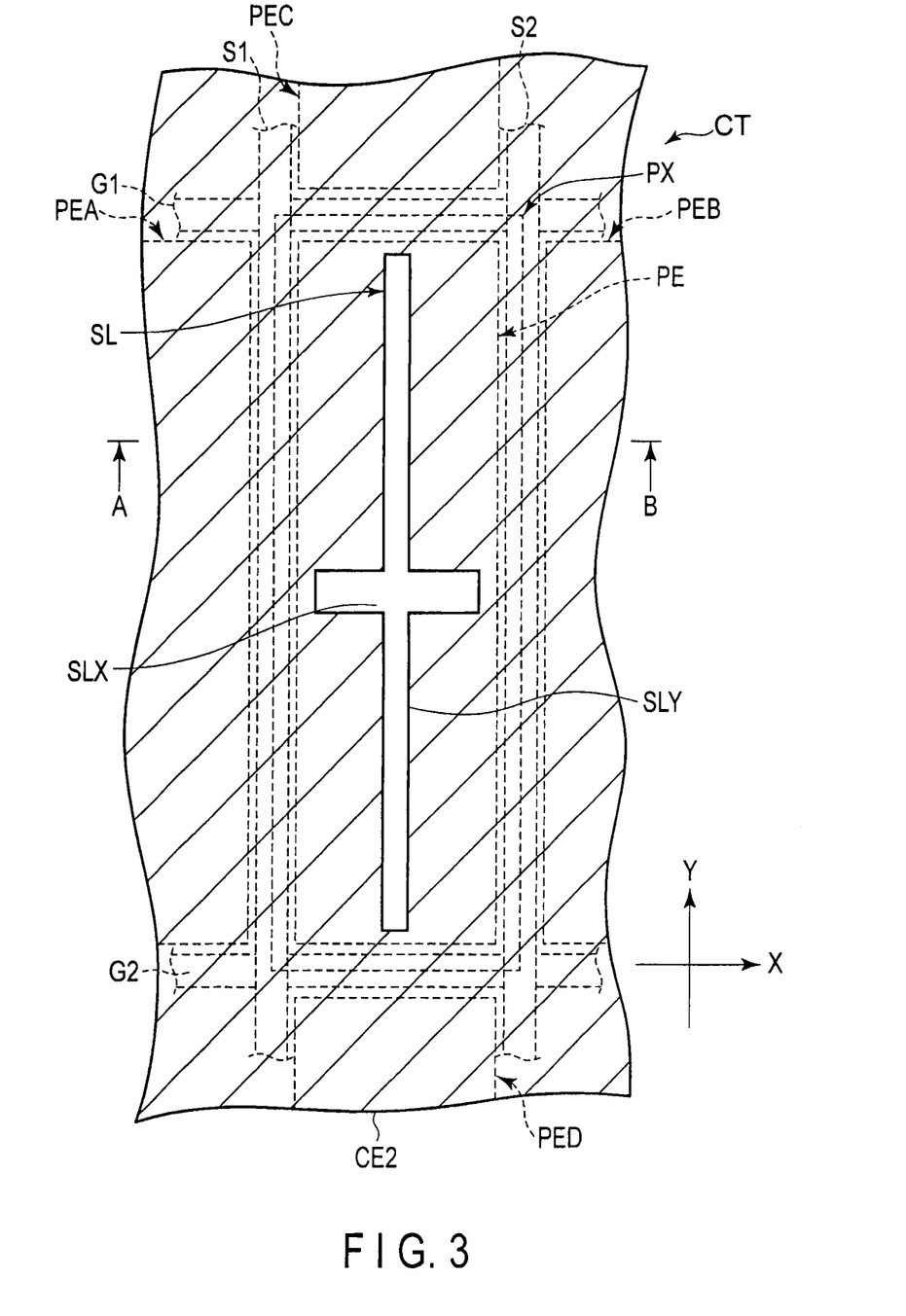
FIG. 3 is a plan view which schematically illustrates a structure example of one pixel PX of a counter-substrate CT which is applicable to the liquid crystal display device of the embodiment.

FIG. 3 is a plan view which schematically shows a structure example of one pixel PX of the counter-substrate CT which is applicable to the liquid crystal display device of the embodiment. FIG. 3 shows only structural parts that are necessary for the description, and the source line S1, source line S2, gate line G1, gate line G2 and pixel electrode PE, which are main parts of the array substrate, are indicated by broken lines, and the depiction of the first common electrode is omitted.

As indicated by upper right (lower left) hatching lines in the Figure, the counter-substrate CT includes a second common electrode CE2. The second common electrode CE2 is electrically connected to the first common electrode CE1 or the power supply module, for example, on the outside of the active area, and has the same potential as the first common electrode CE1.

The second common electrode CE2 is disposed in the pixel PX, and is opposed to the pixel electrode PE. In addition, the second common electrode CE2 extends from the pixel PX beyond the source line S1 and source line S2 in the first direction X and beyond the gate line G1 and gate line G2 in the second direction Y. Specifically, the second common electrode CE2 is disposed continuously over pixels neighboring on the right side and left side along the first direction X of the pixel PX, and pixels neighboring on the upper side and lower side along the second direction Y of the pixel PX. To be more specific, the second common electrode CE2 continuously extends over positions opposed to the pixel electrode PEA, pixel electrode PEB, pixel electrode PEC and pixel electrode PED. Further, the second common electrode CE2 is disposed over almost the entirety of the active area ACT.

A slit SL is formed in the second common electrode CE2 at a position opposed to the pixel electrode PE. In the example illustrated, the slit SL has a cross shape including a horizontal slit SLX extending in the first direction X, and a vertical slit SLY extending in the second direction Y and crossing a substantially middle portion of the horizontal slit SLX. This slit SL corresponds to an alignment control member which mainly controls the alignment of liquid crystal molecules. In the meantime, instead of the slit, some other alignment control member, such as a projection stacked on the second common electrode CE2, may be disposed, if such an alignment control member has a function of controlling the alignment of liquid crystal molecules.

Figure 4:
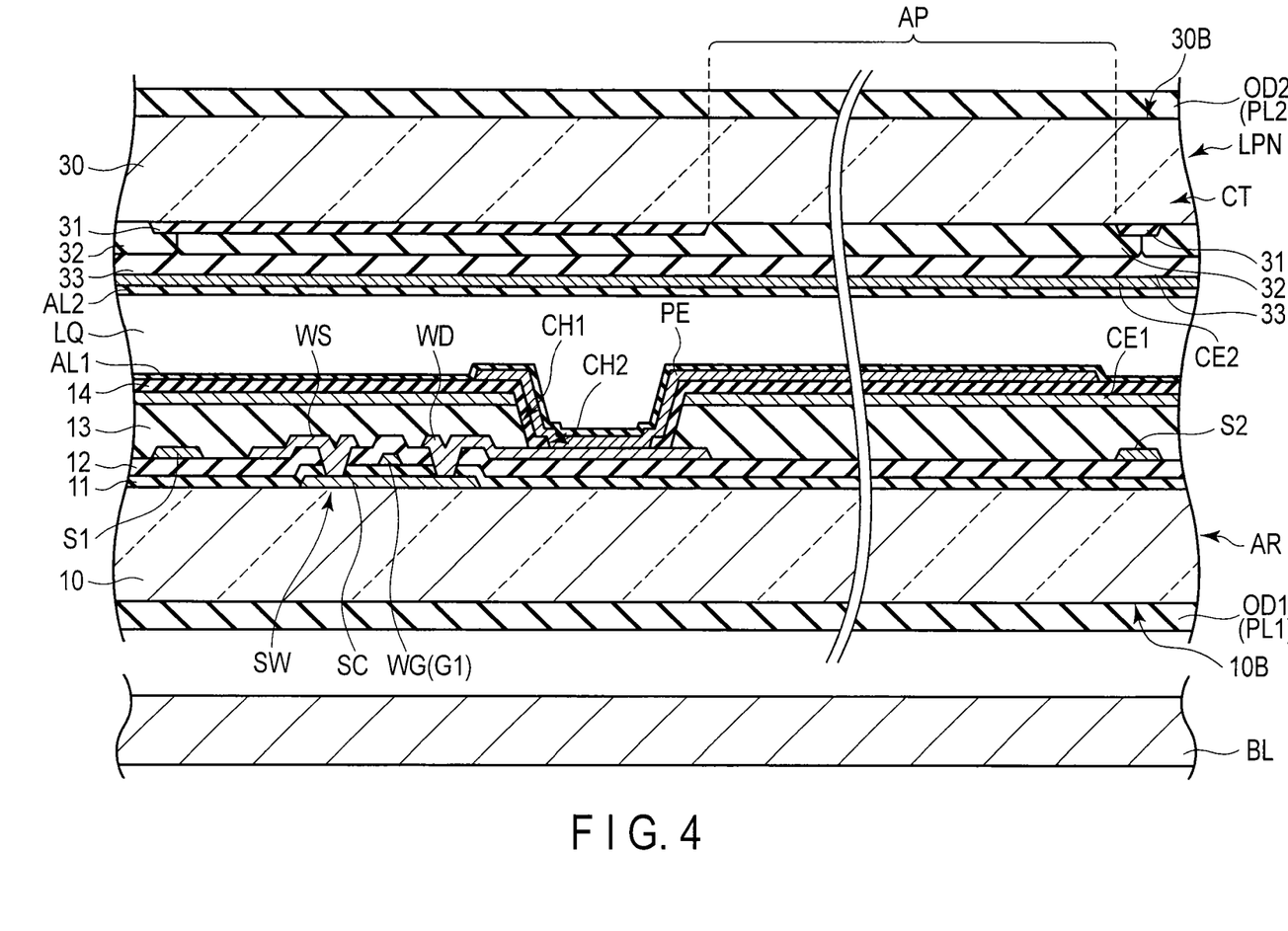
FIG. 4 is a view which schematically illustrates a cross-sectional structure of the liquid crystal display panel LPN including a switching element SW shown in FIG. 2.
Figure 5:
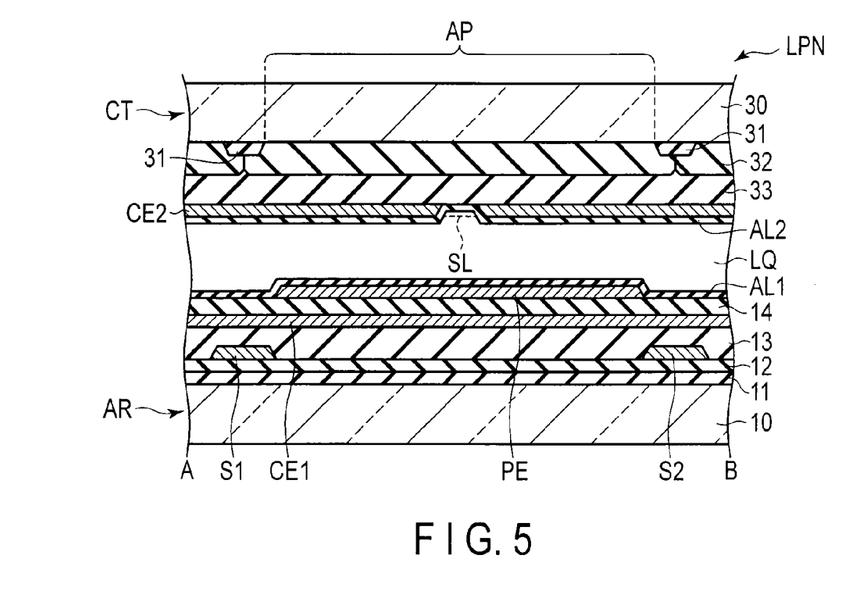
FIG. 5 is a cross-sectional view, taken along line A-B in FIG. 3, which schematically illustrates a cross-sectional structure of the liquid crystal display panel LPN.

FIG. 4 is a view which schematically illustrates a cross-sectional structure of the liquid crystal display panel LPN including the switching element SW shown in FIG. 2. FIG. 5 is a cross-sectional view, taken along line A-B in FIG. 3, which schematically illustrates a cross-sectional structure of the liquid crystal display panel LPN.

Specifically, the liquid crystal display panel LPN of the active matrix type includes an array substrate AR which is a first substrate, a counter-substrate CT which is a second substrate that is disposed to be opposed to the array substrate AR, and a liquid crystal layer LQ which is held between the array substrate AR and the counter-substrate CT.

The array substrate AR is formed by using a first insulative substrate 10 having light transmissivity, such as a glass substrate or a resin substrate. The array substrate AR includes, on that side of the first insulative substrate 10, which is opposed to the counter-substrate CT, a switching element SW, a first common electrode CE1, a pixel electrode PE, a first insulation film 11, a second insulation film 12, a third insulation film 13, a fourth insulation film 14, and a first vertical alignment film AL1.

In the example illustrated, the switching element SW is, for example, a thin-film transistor (TFT) of a top gate type. The switching element SW includes a semiconductor layer SC which is disposed on the first insulative substrate 10. The semiconductor layer SC can be formed of polysilicon, amorphous silicon or an oxide semiconductor. In the meantime, an undercoat layer, which is an insulation film, may be interposed between the first insulative substrate 10 and the semiconductor layer SC. The semiconductor layer SC is covered with the first insulation film 11. The first insulation film 11 is also disposed on the first insulative substrate 10.

A gate electrode WG of the switching element SW is formed on the first insulation film 11, and is located immediately above the semiconductor layer SC. The gate electrode WG is electrically connected to a gate line (e.g. gate line G1) (or formed integral with the gate line G1) and is covered with the second insulation film 12. The second insulation film 12 is also disposed on the first insulation film 11.

A source electrode WS and a drain electrode WD of the switching element SW are formed on the second insulation film 12. A source line S1 and a source line S2 are similarly formed on the second insulation film 12. The source electrode WS illustrated is electrically connected to the source line S1 (or formed integral with the source line S1). The source electrode WS and drain electrode WD are put in contact with the semiconductor layer SC via contact holes penetrating the first insulation film 11 and second insulation film 12. The switching element SW with this structure, as well as the source line S1 and source line S2, is covered with the third insulation film 13. The third insulation film 13 is also disposed on the second insulation film 12. A first contact hole CH1, which penetrates to the drain electrode WD, is formed in the third insulation film 13. The third insulation film 13 is formed of, for example, a transparent resin material. The third insulation film 13 corresponds to a first interlayer insulation film which is located above the gate line G1, gate line G2, source line S1, source line S2 and switching element SW.

The first common electrode CE1 extends over the third insulation film 13. As illustrated in the Figure, the first common electrode CE1 extends above the source line S1 and source line S2, and extends toward neighboring pixels. Incidentally, the first common electrode CE1 does not extend to the first contact hole CH1. The first common electrode CE1 is formed of a transparent, electrically conductive material such as indium tin oxide (ITO) or indium zinc oxide (IZO). The fourth insulation film 14 is disposed on the first common electrode CE1. A second contact hole CH2, which penetrates to the drain electrode WD, is formed in that part of the fourth insulation film 14, which covers the first contact hole CH1. The fourth insulation film 14 has a less thickness than the third insulation film 13, and is formed of, for example, an inorganic material such as silicon nitride. The fourth insulation film 14 corresponds to a second interlayer insulation film which covers the first common electrode CE1.

The pixel electrode PE is formed in an island shape on the fourth insulation film 14 and is opposed to the first common electrode CE1. The pixel electrode PE is electrically connected to the drain electrode WD of the switching element SW via the first contact hole CH1 and second contact hole CH2. This pixel electrode PE is formed of a transparent, electrically conductive material such as ITO or IZO. The pixel electrode PE is covered with the first vertical alignment film AL1.

On the other hand, the counter-substrate CT is formed by using a second insulative substrate 30 with light transmissivity, such as a glass substrate or a resin substrate. The counter-substrate CT includes, on that side of the second insulative substrate 30, which is opposed to the array substrate AR, a light-shield layer 31, color filters 32, an overcoat layer 33, a second common electrode CE2, and a second vertical alignment film AL2.

The light-shield layer 31 partitions each pixel PX in the active area ACT, and forms an aperture portion AP. The light-shield layer 31 is opposed to wiring portions, such as gate lines, source lines and switching elements, which are provided on the array substrate AR.

The color filter 32 is formed in the aperture portion AP, and a part thereof also extends over the light-shield layer 31. The color filters 32 are formed of resin materials which are colored in, e.g. red, green and blue. Boundaries between the color filters 32 of different colors are located at positions overlapping the light-shield layer 31 above the source lines S.

The overcoat layer 33 covers the color filters 32. The overcoat layer 33 planarizes asperities on the surfaces of the light-shield layer 31 and color filters 32. The overcoat layer 33 is formed of, for example, a transparent resin material.

The second common electrode CE2 is formed on that side of the overcoat layer 33, which is opposed to the array substrate AR. As illustrated in the Figure, the second common electrode CE2 extends above the source line S1 and source line S2, and extends toward the neighboring pixels. The second common electrode CE2 is formed of, for example, a transparent, electrically conductive material such as ITO or IZO. A slit SL of the second common electrode CE2 is formed at a position opposed to the pixel electrode PE. In the slit SL, the overcoat layer 33 is exposed. The second common electrode CE2 is covered with the second vertical alignment film AL2. In addition, the second vertical alignment film AL2 covers the overcoat layer 33 which is exposed from the slit SL.

The first vertical alignment film AL1 and second vertical alignment film AL2 are formed of a material which exhibits vertical alignment properties.

The above-described array substrate AR and counter-substrate CT are disposed such that their first vertical alignment film AL1 and second vertical alignment film AL2 are opposed to each other. In this case, a predetermined cell gap is created between the array substrate AR and the counter-substrate CT by columnar spacers which are formed on one of the array substrate AR and counter-substrate CT. The array substrate AR and counter-substrate CT are attached by a sealant in the state in which the cell gap is created. The liquid crystal layer LQ is composed of a liquid crystal composition including negative-type liquid crystal molecules which are sealed in the cell gap created between the first vertical alignment film AL1 and the second vertical alignment film AL2.

A backlight BL is disposed on the back side of the liquid crystal display panel LPN having the above-described structure. Various modes are applicable to the backlight BL. As the backlight BL, use may be made of either a backlight which utilizes a light-emitting diode (LED) as a light source, or a backlight which utilizes a cold cathode fluorescent lamp (CCFL) as a light source. A description of the detailed structure of the backlight BL is omitted.

A first optical element OD1 including a first polarizer PL1 is disposed on an outer surface of the array substrate AR, that is, an outer surface 10B of the first insulative substrate 10. In addition, a second optical element OD2 including a second polarizer PL2 is disposed on an outer surface of the counter-substrate CT, that is, an outer surface 30B of the second insulative substrate 30. The first polarizer PL1 and second polarizer PL2 are disposed, for example, in a positional relationship of crossed Nicols in which their polarization axes are perpendicular to each other.

In the liquid crystal display device having the above-described structure, in an OFF state in which no potential difference is produced between the pixel electrode PE and second common electrode CE2 (i.e. a state in which no voltage is applied to the liquid crystal layer LQ), no electric field is produced between the pixel electrode PE and second common electrode CE2. Thus, liquid crystal molecules included in the liquid crystal layer LQ are initially aligned substantially perpendicular to the substrate major surface (X-Y plane) between the first vertical alignment film AL1 and second vertical alignment film AL2. At this time, part of linearly polarized light from the backlight BL passes through the first polarizer PL1 and enters the liquid crystal display panel LPN. The polarization state of the linearly polarized light, which enters the liquid crystal display panel LPN, hardly varies when the light passes through the liquid crystal layer LQ. Thus, the linearly polarized light emerging from the liquid crystal display panel LPN is absorbed by the second polarizer PL2 that is in the positional relationship of crossed Nicols in relation to the first polarizer PL1 (black display).

On the other hand, in an ON state in which a potential difference is produced between the pixel electrode PE and second common electrode CE2 (i.e. a state in which a voltage is applied to the liquid crystal layer LQ), a vertical electric field is produced between the pixel electrode PE and second common electrode CE2. At this time, a vertical electric field in the vicinity of the slit SL is inclined in a manner to avoid the slit SL. Thus, the liquid crystal molecules are aligned in a direction different from the initial alignment direction, by the effect of the vertical electric field or inclined electric field. Specifically, negative-type liquid crystal molecules are aligned in an oblique direction or a horizontal direction to the substrate major surface, such that the liquid crystal molecules cross the vertical electric field. For example, the liquid crystal molecules are aligned in a plurality of directions, with the position of the cross-shaped slit SL being the boundary, and a plurality of domains, which are divided by the slit SL, are formed.

In this ON state, the polarization state of the linearly polarized light, which enters the liquid crystal display panel LPN, varies depending on the alignment state of the liquid crystal molecules (or the retardation of the liquid crystal layer) when the light passes through the liquid crystal layer LQ. Thus, in the ON state, at least part of the light emerging from the liquid crystal layer LQ passes through the second polarizer PL2 (white display).

In addition, in the ON state, the capacitor, which is formed by the pixel electrode PE and the first common electrode CE1 that are opposed to each other via the fourth insulation film 14, retains a necessary capacitance for displaying an image. Specifically, the pixel potential, which has been written in each pixel via the switching element SW, is retained in the capacitor.

According to the present embodiment, the capacitance, which is necessary for displaying an image in each pixel, can be retained by the capacitor which is formed by the pixel electrode PE and the first common electrode CE1 that are opposed to each other via the fourth insulation film 14. Thus, when the capacitor is formed, a wiring line or electrode, which is formed of a light-shield wiring material crossing the pixel, is needless. In addition, the fourth insulation film 14 is formed to have a less thickness than the third insulation film which is formed of, e.g. a resin material. Thus, a relatively large capacitance can be formed by the pixel electrode PE and first common electrode CE1 via the fourth insulation film 14.

Furthermore, since each of the pixel electrode PE and first common electrode CE1 is formed of the transparent, electrically conductive material, an area overlapping the pixel electrode PE and first common electrode CE1 contributes to display. Thus, compared to a comparative example in which a storage capacitance line crossing a pixel is disposed, it is possible to improve the aperture ratio, transmittance or luminance per pixel, which contributes to display. According to the measurement by the inventor, when the transmittance in the comparative example was 1, it was confirmed that a transmittance of 1.25 was obtained in the present embodiment. Therefore, the display quality can be improved while the capacitance necessary for display is secured.

In addition, since the luminance per pixel can be increased, the cost of the backlight BL can be realized, such as by reducing the number of light sources of the backlight BL.

In the present embodiment, the alignment film material, which exhibits vertical alignment properties, is applied. Specifically, unlike the alignment film material which exhibits horizontal alignment properties, the first vertical alignment film AL1 and second vertical alignment film AL2 require no alignment treatment, such as rubbing. Therefore, a fabrication cost, which is necessary for alignment treatment, can be reduced. Moreover, it is possible to suppress electrostatic breakdown of, e.g. various circuits due to static electricity, which may possibly occur at a time of rubbing, and to prevent occurrence of foreign matter due to rubbing.

Besides, since a slit or some other alignment control member is provided in each pixel and a plurality of domains are formed, a wider viewing angle can be obtained.

The first common electrode CE1 extends above the source line S1 and source line S2. Thus, in the ON state, the first common electrode CE1 can shield an undesired electric field toward the liquid crystal layer LQ from the source line. Specifically, it is possible to suppress the formation of an undesired electric field or undesired capacitance between the source line and the pixel electrode PE or second common electrode CE2, and to suppress a disturbance in alignment of liquid crystal molecules in the region overlapping the source line.

Furthermore, when one of pixels, which neighbor with a source line interposed, is in the ON state and the other is in the OFF state, it is possible to suppress viewing-angle color mixture. This point will be described below with reference to a drawing.

Figure 6:
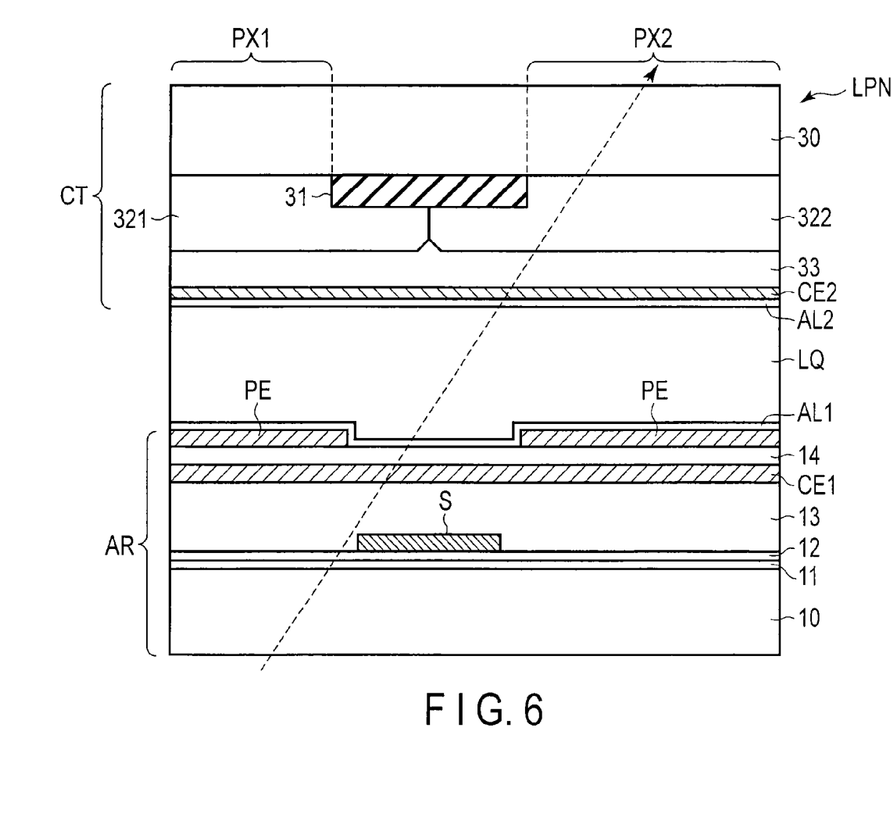
FIG. 6 is a schematic cross-sectional view of the liquid crystal display panel LPN for explaining a limit angle of viewing-angle color mixture.

FIG. 6 is a schematic cross-sectional view of the liquid crystal display panel LPN for explaining a limit angle of viewing-angle color mixture. FIG. 6 shows only the structure that is necessary for the description, and the other structure is illustrated in a simplified manner.

The example illustrated shows a state in which a pixel PX1 and a pixel PX2 neighbor each other, with a source line S interposed, and corresponds to a case in which a color filter 321 is disposed in the pixel PX1 and a color filter 322 having a color different from the color of the color filter 321 is disposed in the pixel PX2. A boundary between the color filter 321 and color filter 322 is located above the source line S.

In the case where the pixel PX1 is in the ON state and the pixel PX2 is in the OFF state, if the liquid crystal molecules in the region overlapping the source line S are aligned in a direction different from the initial alignment direction and if the viewing angle is inclined from the normal of the liquid crystal display panel LPN, transmissive light passing through the pixel PX2, which should be in the OFF state, would be visually recognized. Consequently, not only the transmissive light passing through the pixel PX1, but also the transmissive light passing through the pixel PX2 is mixedly observed, leading to degradation in display quality due to color mixture.

According to the present embodiment, the first common electrode CE1 shields a leak electric field from the source line S. In addition, since the first common electrode CE1 and second common electrode CE2 have the same potential, an equipotential surface is formed by the first common electrode CE1 and second common electrode CE2 in the region overlapping the source line S. Thereby, the liquid crystal molecules in the region overlapping the source line S are kept in the initial alignment state, and even in the case where the liquid crystal display panel LPN is observed in an oblique direction, degradation in display quality due to color mixture can be suppressed. In addition, since there is no need to increase the width of the light-shield layer 31 in order to prevent color mixture, the aperture ratio per pixel can be improved. For example, it should suffice if the width of the light-shield layer 31, which is located above the source line S, is equal to the width of the source line S.

As has been described above, according to the present embodiment, a liquid crystal display device, which can improve display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate including:
an active area in which a plurality of pixels are arranged in a matrix,
a plurality of gate lines,
a first insulation film on the plurality of gate lines,
a plurality of source lines on the first insulation film,
a second insulation film on the plurality of source lines,
a switching element electrically connected to the gate line and the source line in each pixel,
a first common electrode on the second insulation film, extending over substantially the entire active area and formed commonly over the plurality of pixels,
a capacitance insulation film on the first common electrode,
a pixel electrode on the capacitance insulation film, electrically connected to the switching element in each pixel, and
a first vertical alignment film covering the pixel electrode and the capacitance insulation film,
a second substrate including:
a second common electrode opposed to the first common electrode, and extending over substantially the entire active area and formed commonly over the plurality of pixels, and
a second vertical alignment film covering the second common electrode; and
a liquid crystal layer interposed between the first vertical alignment film and the second vertical alignment film, and composed of a liquid crystal composition including negative-type liquid crystal molecules,
wherein the pixel electrode is formed without any slit.

2. The display device of claim 1, wherein the second common electrode has the same potential as the first common electrode.

3. The display device of claim 2, wherein the first common electrode is formed of a transparent, electrically conductive material.

4. The display device of claim 3, wherein the entire pixel electrode overlaps the first common electrode.

5. The display device of claim 4, wherein the capacitance insulation film has a less film thickness than the second insulation film.

6. The display device of claim 1, wherein the second common electrode includes an alignment control member in an area overlapping the pixel electrode.

7. The display device of claim 1, wherein the first common electrode overlaps the gate lines and the source lines.

8. A display device comprising:
a first substrate including:
an active area in which a plurality of pixels are arranged in a matrix,
a plurality of gate lines,
a first insulation film on the plurality of gate lines,
a plurality of source lines on the first insulation film,
a second insulation film on the plurality of source lines,
a switching element electrically connected to the gate line and the source line in each pixel,
a first common electrode on the second insulation film, extending over substantially the entire active area and formed commonly over the plurality of pixels,
a capacitance insulation film on the first common electrode,
a pixel electrode on the capacitance insulation film, electrically connected to the switching element in each pixel, and
a first vertical alignment film covering the pixel electrode and the capacitance insulation film,
a second substrate including:
a second common electrode opposed to the first common electrode, and extending over substantially the entire active area and formed commonly over the plurality of pixels, and
a second vertical alignment film covering the second common electrode; and
a liquid crystal layer interposed between the first vertical alignment film and the second vertical alignment film, and composed of a liquid crystal composition including negative-type liquid crystal molecules,
wherein the second common electrode includes an alignment control member in an area overlapping the pixel electrode, and the pixel electrode is formed without any slit.

9. The display device of claim 8, wherein the alignment control member has a rectangular shape extending parallel to the gate lines.

10. The display device of claim 8, wherein the alignment control member has a rectangular shape extending parallel to the source lines.

11. The display device of claim 8, wherein the alignment control member has a cross shape.

12. The display device of claim 8, wherein the alignment control member is a projection.

13. The display device of claim 8, wherein the first common electrode overlaps the gate lines and the source lines.

14. A display device comprising:
a first substrate including:
an active area in which a plurality of pixels are arranged in a matrix,
a plurality of gate lines,
a first insulation film on the plurality of gate lines,
a plurality of source lines on the first insulation film,
a second insulation film on the plurality of source lines,
a switching element electrically connected to the gate line and the source line in each pixel,
a first common electrode on the second insulation film, extending over substantially the entire active area and formed commonly over the plurality of pixels,
a capacitance insulation film on the first common electrode,
a pixel electrode on the capacitance insulation film, electrically connected to the switching element in each pixel, and
a first vertical alignment film covering the pixel electrode and the capacitance insulation film,
a second substrate including:
a second common electrode opposed to the first common electrode, and extending over substantially the entire active area and formed commonly over the plurality of pixels, and
a second vertical alignment film covering the second common electrode; and
a liquid crystal layer interposed between the first vertical alignment film and the second vertical alignment film, and composed of a liquid crystal composition including negative-type liquid crystal molecules,
wherein the second substrate further includes a light-shield layer partitioning each pixel in the active area and forming a plurality of aperture portions, and the first common electrode entirely overlaps the plurality of aperture portions,
wherein the light-shield layer overlaps the plurality of gate lines and the plurality of source lines, and the first common electrode overlaps the gate lines and the source lines.

15. The display device of claim 14, wherein the pixel electrode and the switching element are connected to each other via a contact hole formed in the second insulation film and the capacitance insulation film, and the first common electrode has an opening portion in an area in which the contact hole is formed.

16. The display device of claim 14, wherein the pixel electrode is formed without any slit.

17. The display device of claim 14, wherein the second common electrode includes an alignment control member in an area overlapping the pixel electrode.

* * * * *